A. L. DALLAIRE.
FOLDABLE VEHICLE TOP.
APPLICATION FILED AUG. 9, 1907.
946,658.
Patented Jan. 18, 1910.
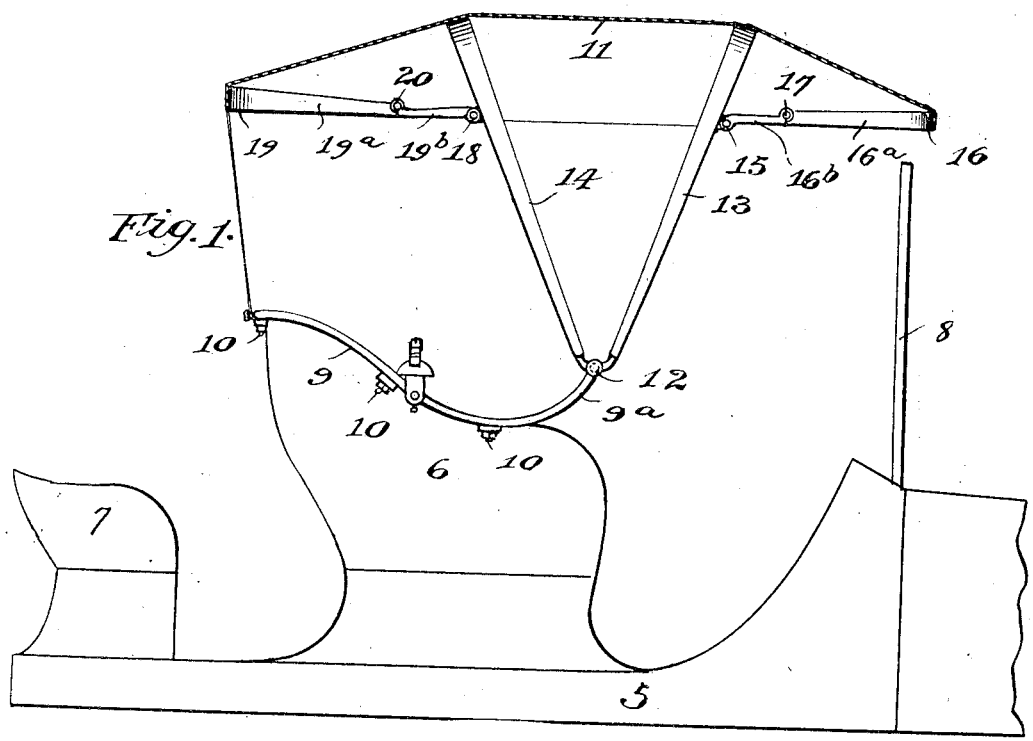
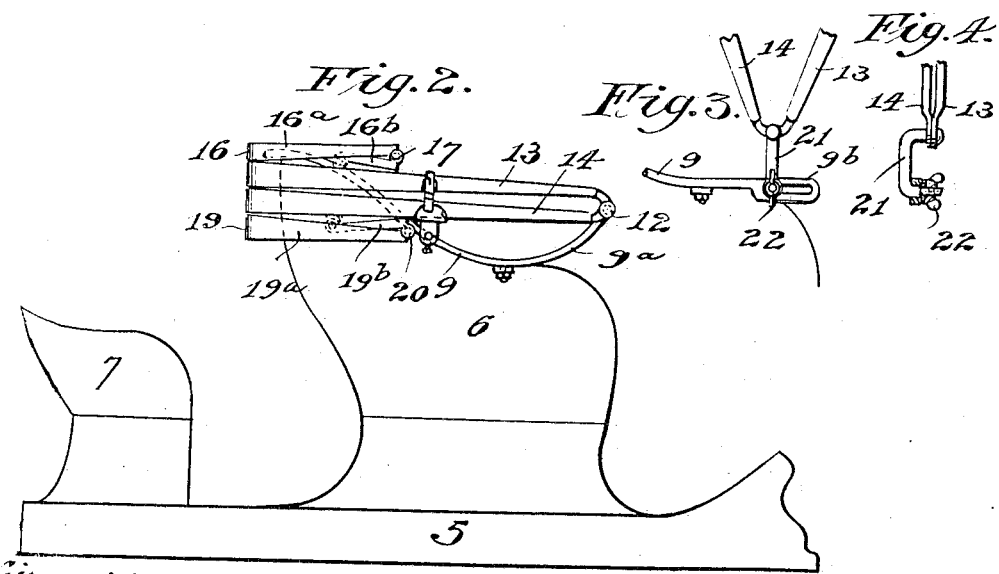
Witnesses:
Inventor,
Alford L. Dallaire
By Offield, Towle & Linthicum
Attys.

UNITED STATES PATENT OFFICE.

ALFORD L. DALLAIRE, OF CHICAGO, ILLINOIS, ASSIGNOR TO STUDEBAKER BROTHERS MANUFACTURING COMPANY, OF SOUTH BEND, INDIANA, A CORPORATION OF INDIANA.

FOLDABLE VEHICLE-TOP.

946,658.

Specification of Letters Patent. Patented Jan. 18, 1910.

Application filed August 9, 1907. Serial No. 387,872.

*To all whom it may concern:*

Be it known that I, ALFORD L. DALLAIRE, a citizen of the United States, residing at Chicago, in the county of Cook and State of Illinois, have invented certain new and useful Improvements in Foldable Vehicle-Tops, of which the following is a specification.

This invention relates to foldable tops for automobiles, carriages, and other vehicles employing such tops; and the invention is more particularly designed for and applicable to vehicle bodies of that class having, in addition to the main seat of the body which is covered and protected by the foldable top, a smaller seat extending rearwardly thereof, designed to accommodate a servant or extra passenger. Heretofore, so far as I am aware, the foldable tops employed on this style of vehicle body have been objectionable in a measure, in that the top, when folded, extended so far behind the back of the main seat as to interfere with the comfort or convenience of the person occupying the rear seat; and the main object of the present invention, in so far as it relates to vehicle bodies of this class, is to provide a foldable top of sufficient height and length to afford ample protection to the occupants of the main seat, and at the same time be capable of folding back to a position upon or closely behind the upper edge of said main seat and out of the way of the occupant of the rear seat. While the invention is particularly useful in connection with vehicle bodies of this class, yet it may conveniently and advantageously be employed as a neat and compact construction upon covered vehicle bodies having but a single seat.

The invention will be readily understood when considered in connection with the accompanying drawings, in which,—

Figure 1 is a side elevational view of an automobile body with my improved foldable top applied thereto. Fig. 2 is a similar view with the front portion of the body omitted and illustrating the folded position of the top, the cover, however, being omitted for the sake of greater clearness. Figs. 3 and 4 are fragmentary views in side elevation and cross-section of a slight modification in the manner and means of hinging the lower ends of the intermediate or inclined bows of the top permitting a somewhat greater height of the latter consistently with the attainment of the result sought by the invention.

Referring to the drawings, 5 designates as an entirety the body of an automobile, the same being shown simply in outline and without details, for the sake of clearness; 6 designates the main seat of the body; 7 designates the rear seat mounted on the rear end of the body floor or platform; and 8 designates a wind shield or guard.

Suitably mounted upon and secured to the upper margins of the back and sides of the main seat 6 is a suitably bent metal frame strip 9 provided at intervals with buttons 10, as usual, for the attachment of the sides of the cover, which latter is shown in Fig. 1 at 11. The forward ends of the strip 9 are curved upwardly as shown at 9ª, and receive the horizontal pivot-bolts 12 on which the main front and rear inclined bows 13 and 14 of the top are co-axially pivoted. Pivoted at 15 to the forward edge of the front bow 13 is a forwardly projecting horizontal bow 16, the side members of which are jointed as shown at 17 by means of a common stop-joint which permits the two sections 16ª and 16ᵇ to be folded and unfolded through an angle of approximately 180 degrees, but limits the unfolding thereof to a straight position in which they are in alinement, after the fashion of an ordinary carpenter's rule. Similarly pivoted at 18 to the rear edge of the rear inclined bow 14 is a rearwardly projecting horizontal bow 19, the side members of which are similarly hinged at 20 by a joint similar in all respects to the joint 17 of the forwardly projecting bow 16, and permitting the hinged sections 19ª and 19ᵇ to fold upon each other through an angle of approximately 180 degrees, but limiting the unfolding movement to a position in which the sections 19ª and 19ᵇ are substantially straight or in longitudinal alinement. In practice, the hinged sections of the side members of both the front and rear bows 16 and 19 are capable of extension slightly past a straight line through the hinge, as is usual in this class of joints, to maintain the joint normally against collapse when the hinged sections are opened out. The cover 11 is secured at its front end to the transverse member of the forward bow 16 and supports the latter when unfolded, and is likewise secured to the rearwardly extending bow 19 at the point where it passes over the latter; the rear end of the cover being secured to the rear transverse margin of the seat back.

It will be observed that the sections 16ª of the bow 16 are approximately equal to the combined lengths of the section 16ᵇ and the height of that portion of the inclined bow 13 between the pivot 15 and its upper end, and the same is true of the section 19ª of the rear bow 19 relatively to the corresponding parts with which it coöperates; so that when the sides of the bows 16 and 19 are folded, as represented in Fig. 2, the transverse outer members of the bows lie directly against the transverse outer members of the intermediate inclined bows 13 and 14, which latter, being of equal radii, fold into transverse alinement with each other, as shown in Fig. 2. The radial distance from the pivot 12 to the upper ends of the bows 13 and 14 is slightly greater than the distance from the pivot 12 to the rear transverse edge of the back of the main seat, so that all four parts fold snugly down behind the latter, as shown in Fig. 2; the material of the cover collapsing after the fashion of a bellows between the bows, as is usual in this type of folding top. Where it may be desirable to secure somewhat greater height of the top relatively to the depth of the main seat, this may be readily secured by the means illustrated in Figs. 3 and 4, wherein it will be seen that the frame strip 9 has a comparatively straight forward slotted extension 9ᵇ, in which is slidably mounted the lower end of a goose-neck 21 to the upper end of which the intermediate inclined bows 13 and 14 are pivoted. When the top is raised the goose-neck 21 is normally at the inner end of the frame strip; but when the top is to be folded, the wing-nuts 22 are loosened, and the goose-neck slid forwardly to the forward end of the slot and there clamped, which thereby carries the pivot point 12 sufficiently forward to secure the described folding of the bows close against the back of the main seat and out of the way of the occupant of the rear seat.

I claim:

1. The combination with a vehicle body having a seat thereon, of single supporting members mounted on the two sides of said seat, respectively, a pair of oppositely inclined bows the sides whereof are co-axially pivoted at their lower ends to said supporting members and are of a length substantially equal to the distance between their pivots and the rear upper margin of said seat, forwardly and rearwardly extending horizontal bows having jointed sides pivoted at their inner ends to said inclined bows, respectively, and a top cover, substantially as described.

2. The combination with a vehicle body having a seat thereon, of single supporting members mounted on the two sides of said seat, respectively, a pair of oppositely inclined bows the sides whereof are co-axially pivoted at their lower ends to said supporting members and are of a length substantially equal to the distance between their pivots and the rear upper margin of said seat, forwardly and rearwardly extending horizontal bows having jointed sides pivoted at their inner ends to said inclined bows, respectively, said sides being jointed at points therein such as to cause the transverse members of said parts to lie, when the top is folded, substantially flush with the transverse members of said inclined bows, and a top cover, substantially as described.

ALFORD L. DALLAIRE.

Witnesses:
SAMUEL N. POND,
FREDERICK C. GOODWIN.